United States Patent [19]

Miller

[11] 4,047,170
[45] Sept. 6, 1977

[54] MONOTRACK RADAR RECORDING/PLAYBACK SYSTEM

[75] Inventor: Robert E. Miller, Ellicott City, Md.

[73] Assignee: The Johns Hopkins University, Baltimore, Md.

[21] Appl. No.: 630,506

[22] Filed: Nov. 10, 1975

[51] Int. Cl.² .......................... G01S 9/02; G01S 7/30
[52] U.S. Cl. .............................. 343/5 PC; 346/33 EC
[58] Field of Search ................ 343/5 PC; 346/33 EC

[56] References Cited

U.S. PATENT DOCUMENTS

| 3,588,896 | 8/1969 | Duarte | 343/5 |
| 3,634,887 | 7/1969 | Buchholz | 343/5 |
| 3,849,776 | 10/1972 | Swynford-Lain | 342/5 |

FOREIGN PATENT DOCUMENTS

| 1,289,584 | 3/1970 | United Kingdom | 343/5 |

*Primary Examiner*—Nelson Moskowitz
*Attorney, Agent, or Firm*—Robert E. Archibald

[57] ABSTRACT

A recording/reproducing system for radar and similar type data is provided wherein all data necessary to record and later reproduce an accurate data (radar) display is formatted on a single recording track; e.g., on magnetic tape, in the form of a single composite signal. In one embodiment, the composite signal contains radar video and trigger markers and is chopped by a multi-bit, bi-phase data signal containing word synchronization sequence, trigger identification, radar coordinate information, and any other pertinent data, as desired. In a second embodiment, the radar video and trigger markers frequency modulate one carrier signal, which is then combined with a second carrier which has been frequency modulated with data (i.e., word synchronization, trigger identification, coordinate information, etc.) to form the composite signal. The reproduce portion of the proposed system then decodes or demodulates the composite signal in order to recover the component signals and convert them back to the proper radar video, triggers and bearing format for display.

16 Claims, 15 Drawing Figures

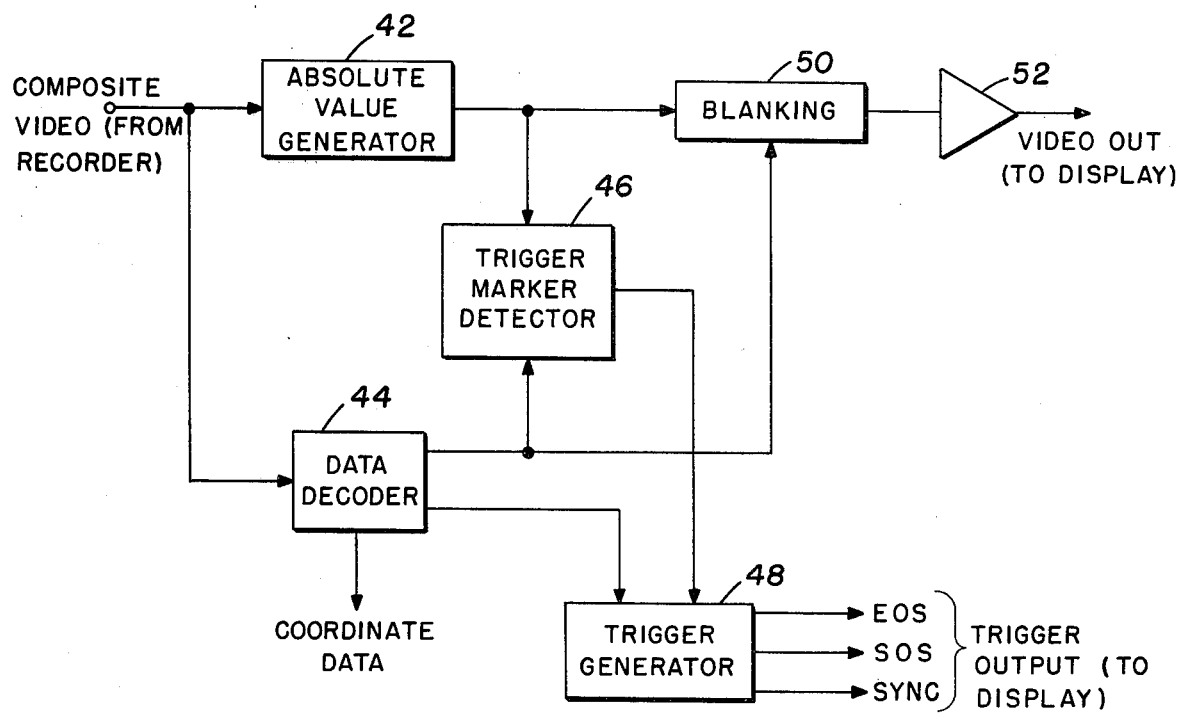
FIG. 2
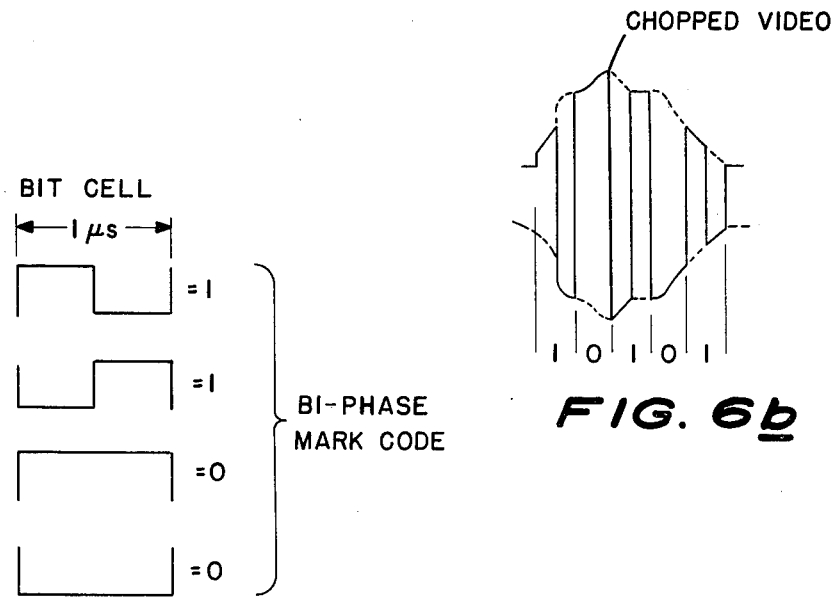
FIG. 6b
FIG. 6a

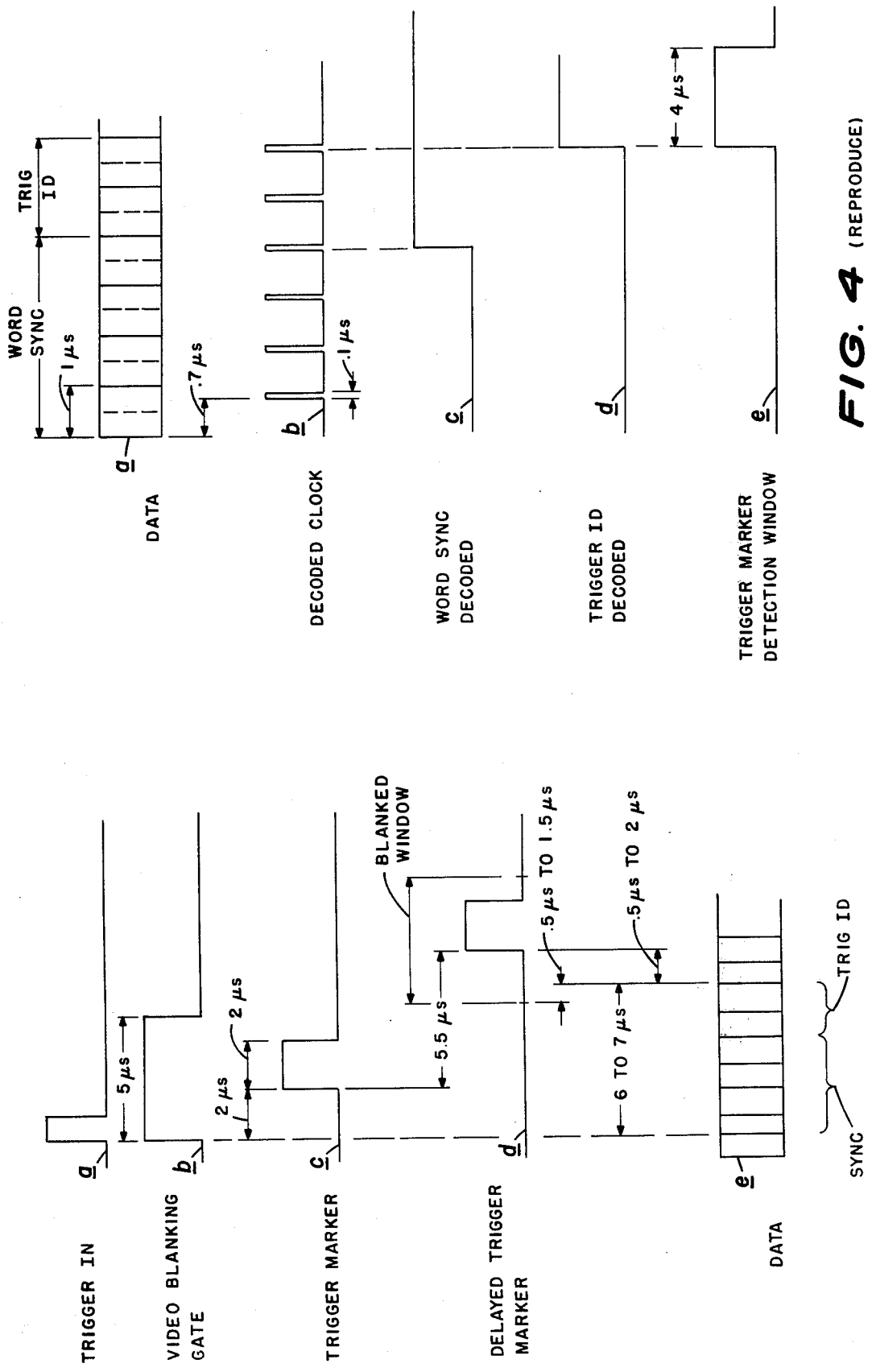

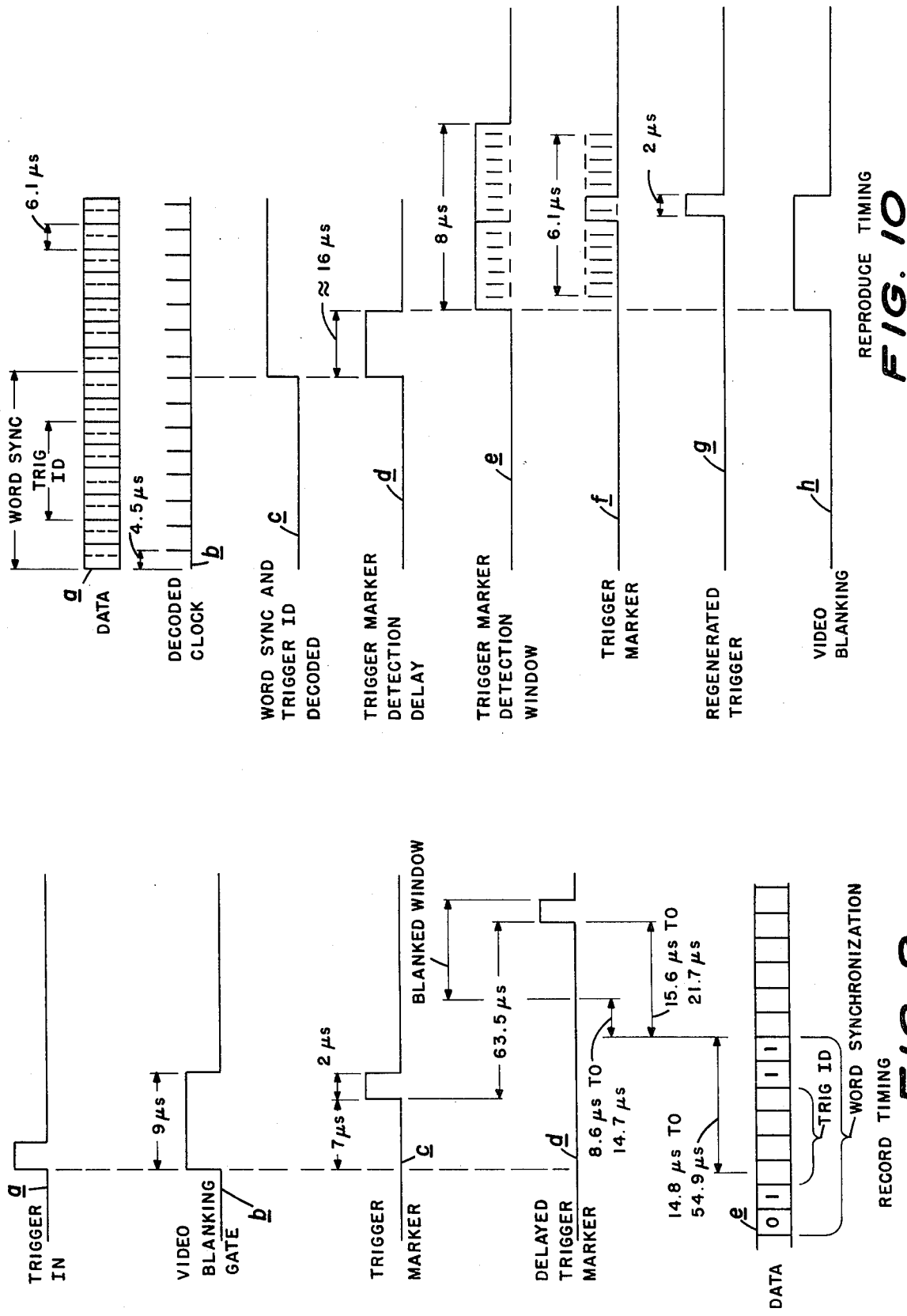

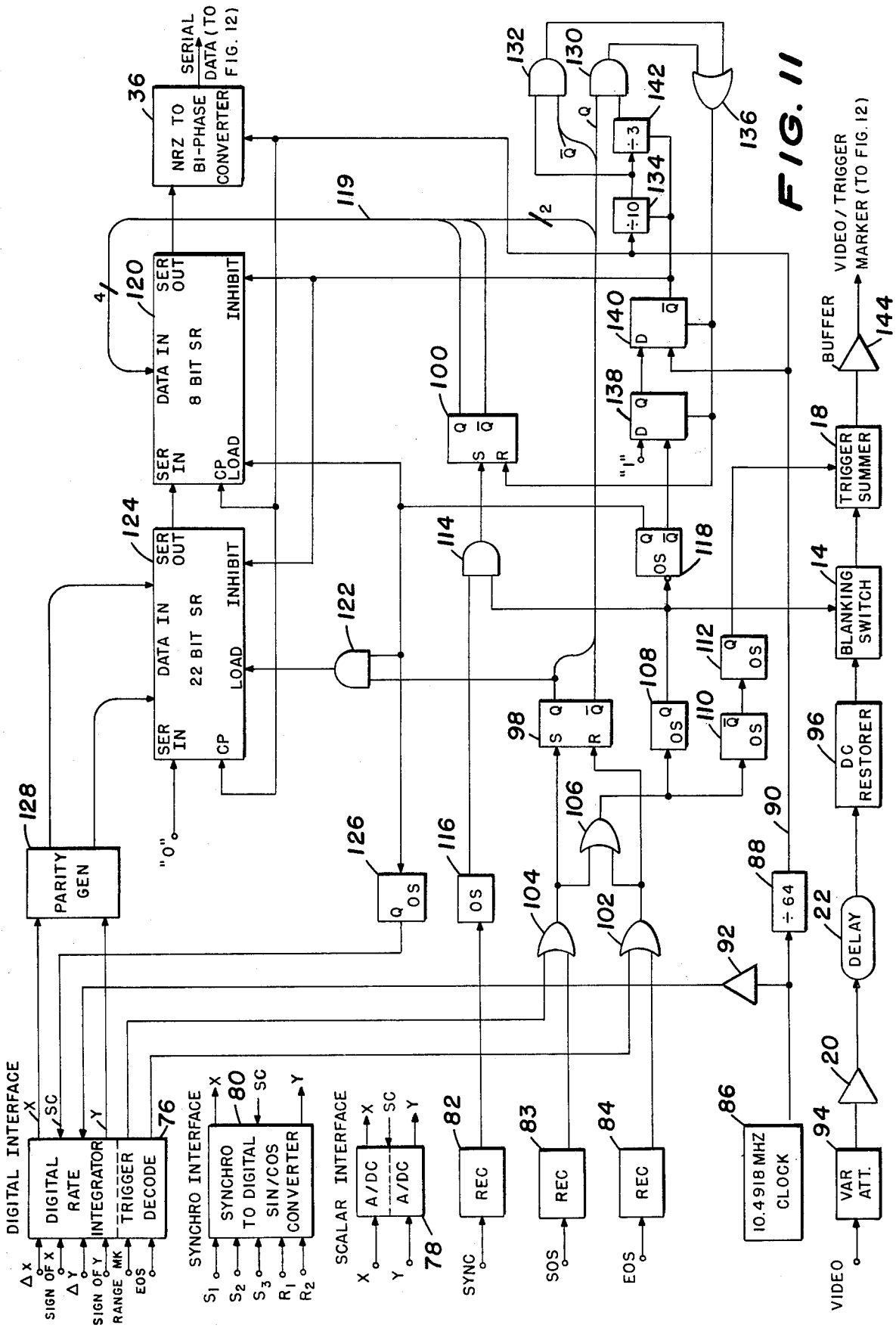

MONOTRACK RADAR RECORDING/PLAYBACK SYSTEM

BACKGROUND AND SUMMARY OF THE INVENTION

It is well-known that magnetic tape recorders may be used, for example, in television recording systems for the recording of video information and related audio signals. Normally, in this type of system, two distinct recording tracks were utilized, one for the video signal and one for the audio. Similarly, it is common practice in the art of radar data recording, to record video and trigger pulses on a first magnetic tape track and to record antenna coordinate (bearing) information on a second tape track, the coordinate data being modulated with audio message data, if desired.

More specifically, in the field of radar data recording, it has been proposed previously to combine the radar video and trigger pulses to form a composite signal which is recorded on a first tape track of a multiple track recorder, with antenna position data signals (in either scalar or synchro format) being separately recorded on a second track of the recorder. An example of this type of radar data recorder is disclosed in the U.S. patent to Buchholz et al, U.S. Pat. No. 3,634,887, issued Jan. 11, 1972. In U.S. Pat. No. 3,725,912, issued Apr. 3, 1973, Buchholz et al subsequent disclose a radar data recording/reproducing system wherein a composite signal is generated for recording on a single tape track, including not only the summed video and trigger pulses but also digital representation of radar antenna elevation angle. In this later patent, the video information is blanked during the interval that the digital code of elevation angle is being recorded. Trigger identification is accomplished by converting the radar triggers to pulses of controlled polarities, prior to summing them with the video.

In order to overcome the deficiency of these and other prior art techniques for the recording and playback of radar and similar types of informational signals/data, the present invention provides an improved method and apparatus to facilitate the recording, on a single magnetic tape track for example, of all such radar information and in a manner which preserves system timing and assures faithful reproduction of the radar display upon playback. Additionally, the proposed system of the present invention obviates the need to rely upon precise timing of the trigger pulse recording, in order to identify the various triggers encountered in radar system operation, and it also enables the radar coordinate information to be recorded on the same recording track as the video information without loss of video, thus improving significantly the quality of the reproduced radar display. As will be described in more detail hereinafter, the proposed radar recording/reproducing apparatus of the present invention is also compatible with fixed or variable PRF type radars, without requiring time consuming manual set-up or expensive delay lines.

In one embodiment of the present invention, the recorded composite signal contains radar video and trigger markers and is chopped by a bi-phase, multi-bit data signal comprising (1) a four-bit synchronizing sequence which identifies the beginning of a data word, (2) a two-bit trigger identification code (which necessarily precedes the associated trigger marker in the composite signal), and (3) 20-bits of radar bearing or other related data. The bi-phase code has two fundamental frequencies, the bit rate frequency and twice the bit rate frequency. Thus, a logical zero has, for example, a zero crossing or transition at the beginning of each bit cell, whereas a logical one has a transition both at the beginning and at the center of each bit cell. As a result, the data may be decoded by merely detecting the zero crossing transitions. As will be described in detail later, each time a start of sweep (SOS) or end of sweep (EOS) trigger is received, a data word is formatted in the bi-phase code, consisting of the word synchronization sequence, trigger identification code and bearing data components, etc., as noted above.

In a second embodiment, the radar video and trigger markers frequency modulate a first carrier signal, which is later combined with a second carrier which has previously been frequency modulated with the bi-phase data, including word synchronization, trigger identification, radar coordinates, etc., to form the composite signal for recording. Here again, following frequency demodulation, recovery of the trigger identification code occurs prior to recovery of the trigger marker, with the data being decoded by detection of the zero crossing transitions of the data bits.

Without in any way attempting to limit the spirit or scope of the present invention, it will be clear to those skilled in the art that the proposed monotrack recording/playback system of the present invention has utility in diverse recording/reproducing applications such as, for example, both single and multiple track radar recording/playback, radar information transmission applications, and, in general, to the recording and playback of any wideband information which necessarily must be synchronized to specific events; i.e., to the trigger pulses in radar applications. By way of examples, a radar data recording/reproducing system such as is proposed in accordance with the present invention could be utilized for analyzing radar information obtained over a long period of time; for use in the training of radar operators; and, to provide a permanent and retrieval record of radar information relative to vehicle navigation, for example, which can be replayed as desired, for study or investigative purposes in the event of an accident, etc. It should also be understood at this time that the specific bi-phase code, bit widths, number of bits used, etc. can obviously be altered depending upon the requirements of practice, without in any manner departing from the spirit or scope of the present invention.

In view of the foregoing discussion, one object of the present invention is to provide a system wherein all signals necessary to record and playback signals, such as those required to reproduce a radar display can be accommodated on a single wideband magnetic tape track.

Another object of the present invention is to provide a monotrack radar data recording/playback system compatible with fixed or variable PRF radars.

A further object of the present invention is to provide a monotrack radar data recording/playback system employing recorded, positively identified radar triggers and recorded bearing coordinates which are synchronized with the recorded video signals.

A further object of the present invention is to provide apparatus capable of recording on a single tape track the video, triggers and coordinate information from diverse types of radar systems and capable of being implemented on commercially available color TV video recording apparatus.

Other objects, purposes and characteristic features of the present invention will in part be pointed out as the description of the present invention progresses and in part be obvious from the accompanying drawings, wherein:

FIG. 2 is a block diagram of apparatus proposed in accordance with the same embodiment of the present invention for recovering the components of the composite recorded signal and converting them back to the appropriate radar video, triggers and coordinate format;

FIG. 3 is a series of timing diagrams illustrating various events during operation of the apparatus of FIG. 1 while generating the composite signal for recording;

FIG. 4 is a series of timing diagrams illustrating various events occurring during operation of the reproduce apparatus of FIG. 2;

FIGS. 6a and 6b are diagrams illustrating typical code bits employed in the preferred embodiments of the present invention;

FIG. 9 is a series of timing diagrams illustrating various events occurring during operation of the recording apparatus of FIG. 7;

Figure 7:
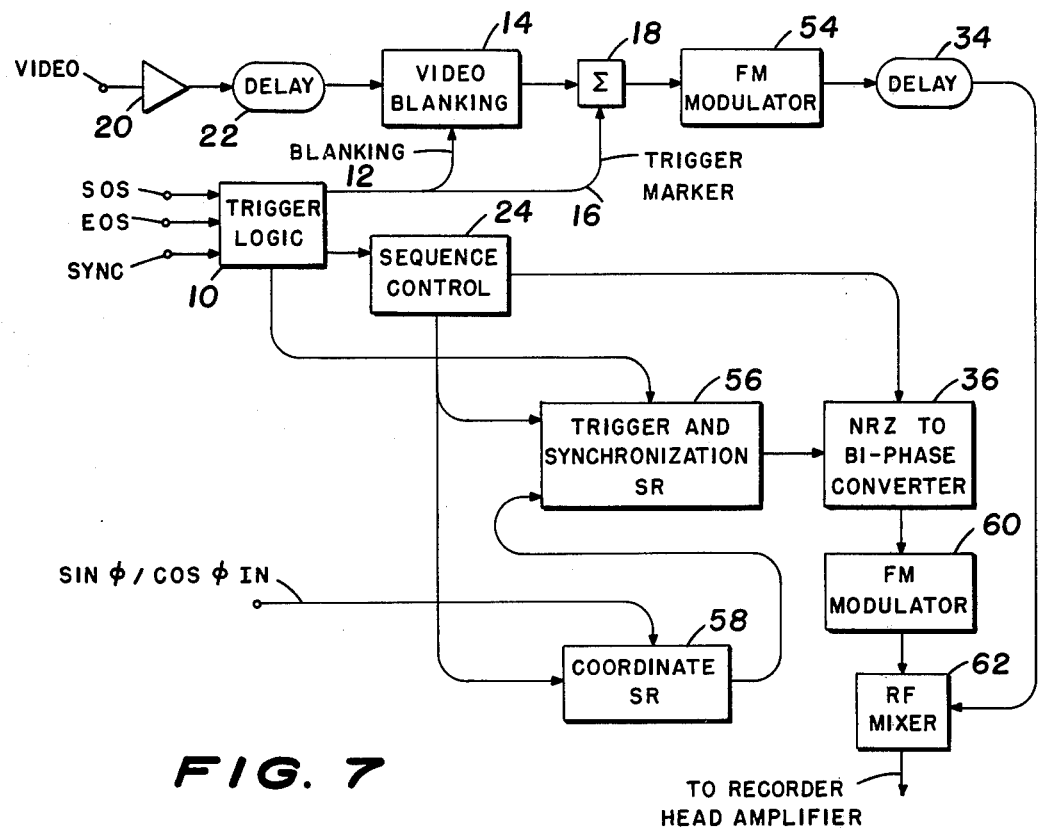
FIG. 7 is a block diagram of apparatus constituting a second embodiment of the present invention to form or generate the composite video signal for recording and wherein frequency modulation techniques are employed.
Figure 8:
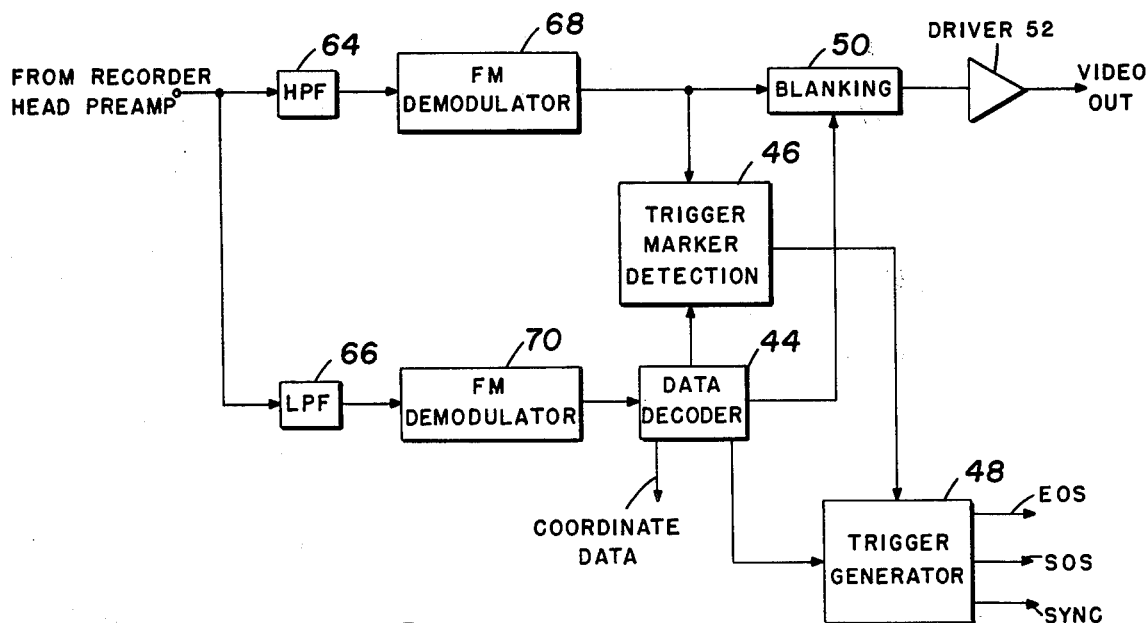
FIG. 8 is a block diagram illustrating the associated reproduce apparatus of this second embodiment.
Figure 12:
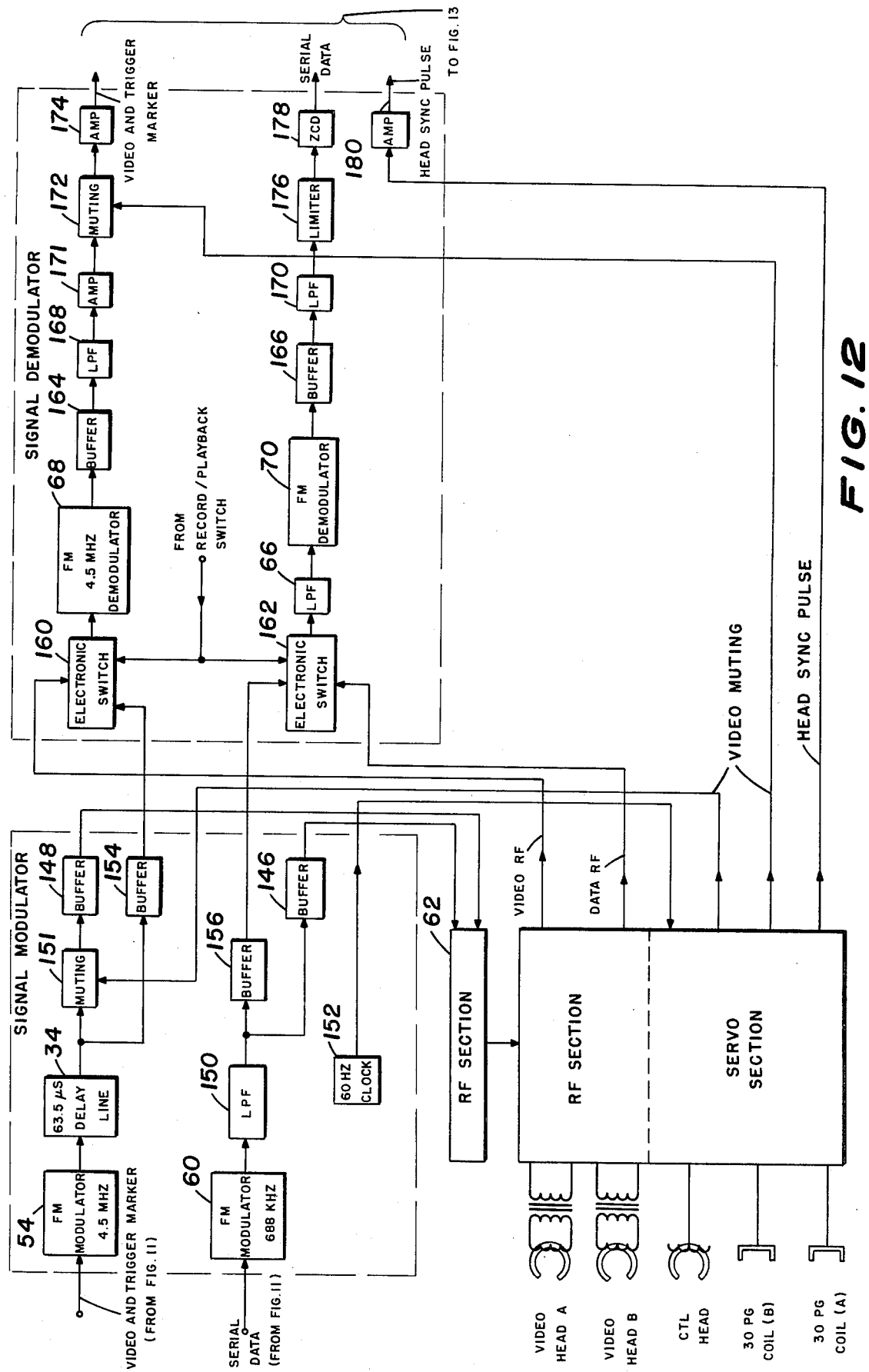
Figure 13:
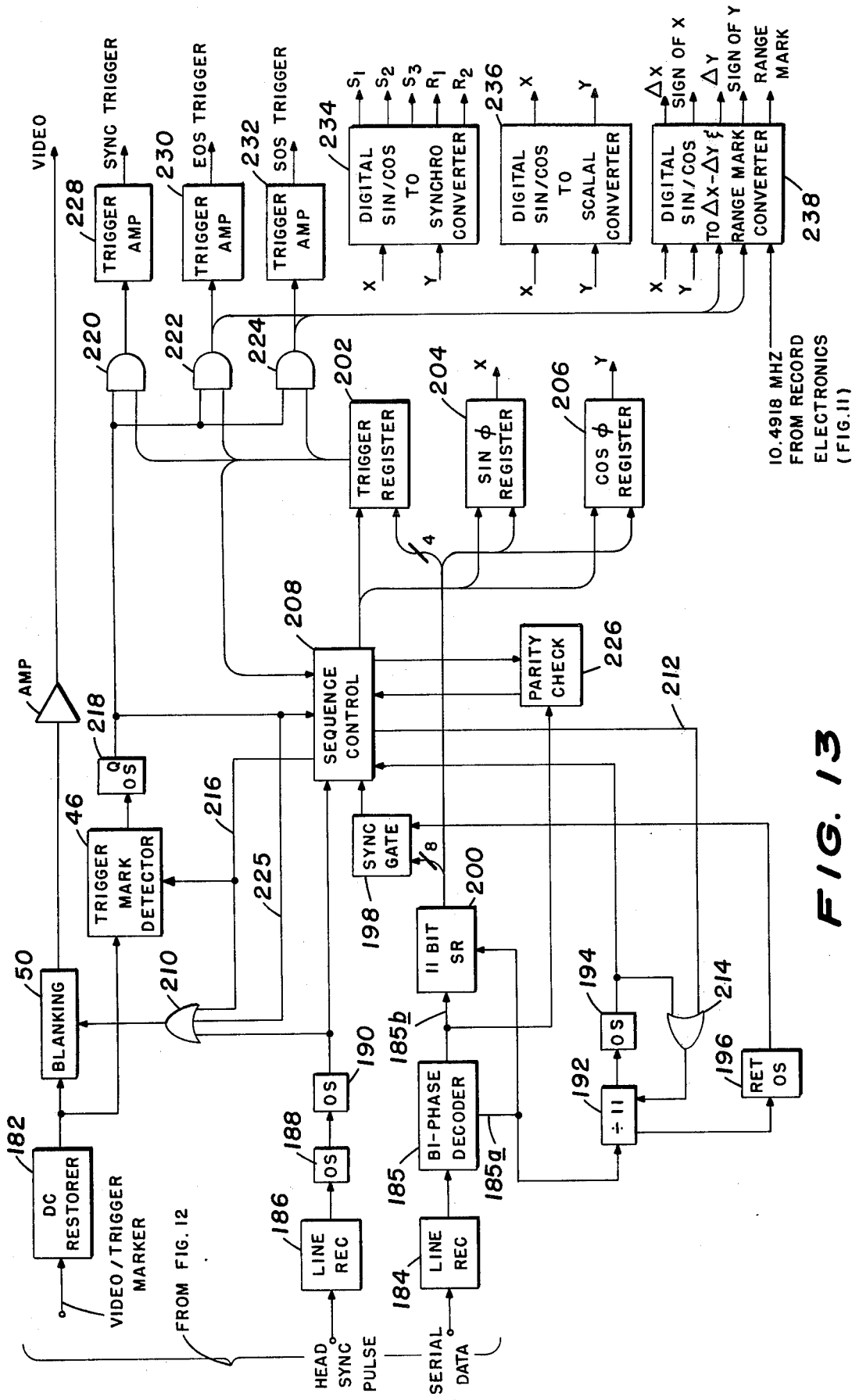

FIG. 10 is a series of timing diagrams illustrating various events occurring during operation of the reproduce apparatus of FIG. 8; and FIGS. 11, 12 and 13 form a detailed block diagram illustrating one implementation of the record and reproduce apparatus forming the second embodiment of the present invention as shown in FIGS. 7 and 8, and also illustrating how this second embodiment of the present invention can be implemented on a commercially available color television video cassette recorder.

Figure 14:
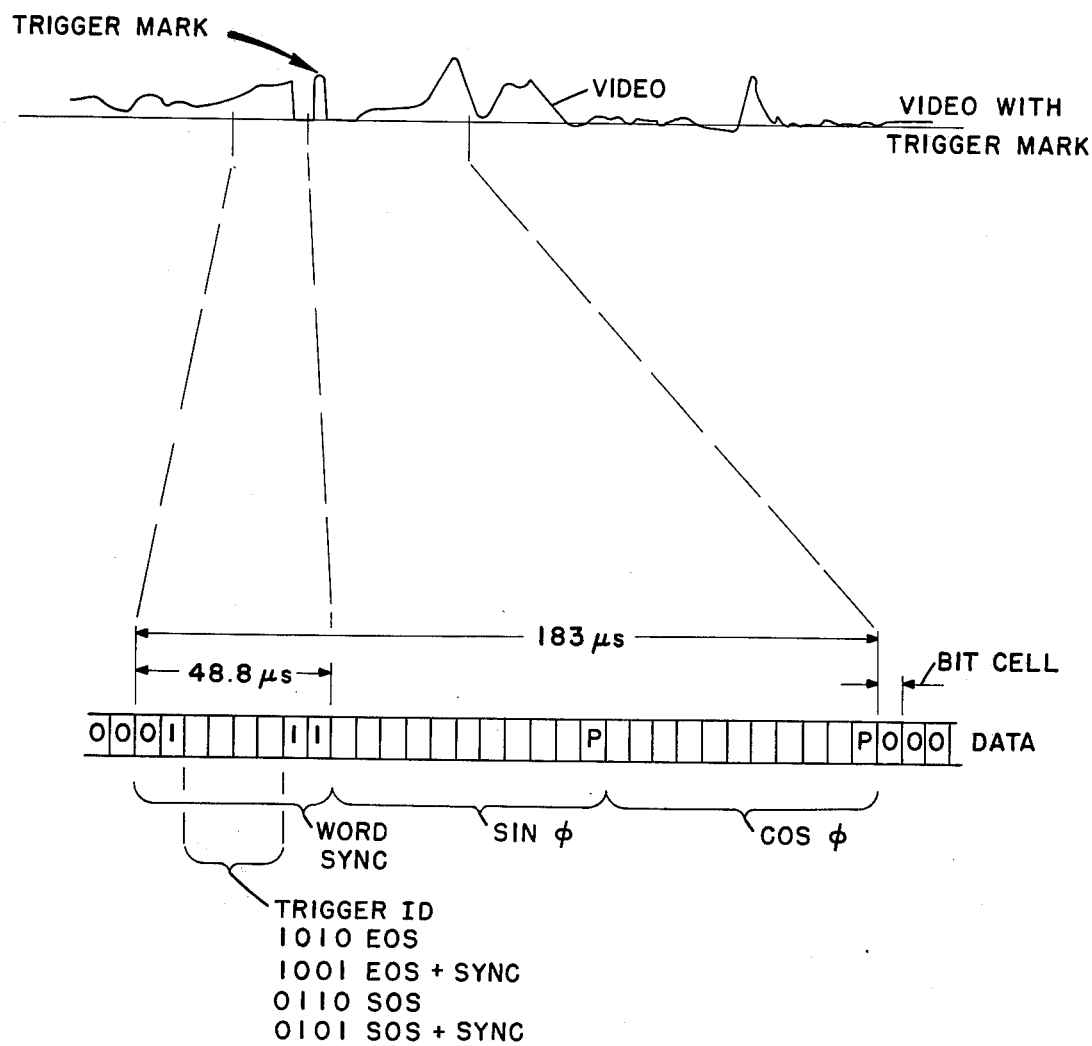

FIG. 14 illustrates a typical composite video signal generated for single track recording in accordance with the present invention and also the format employed in the second embodiment of the invention during typical data and coding.

Figure 5:
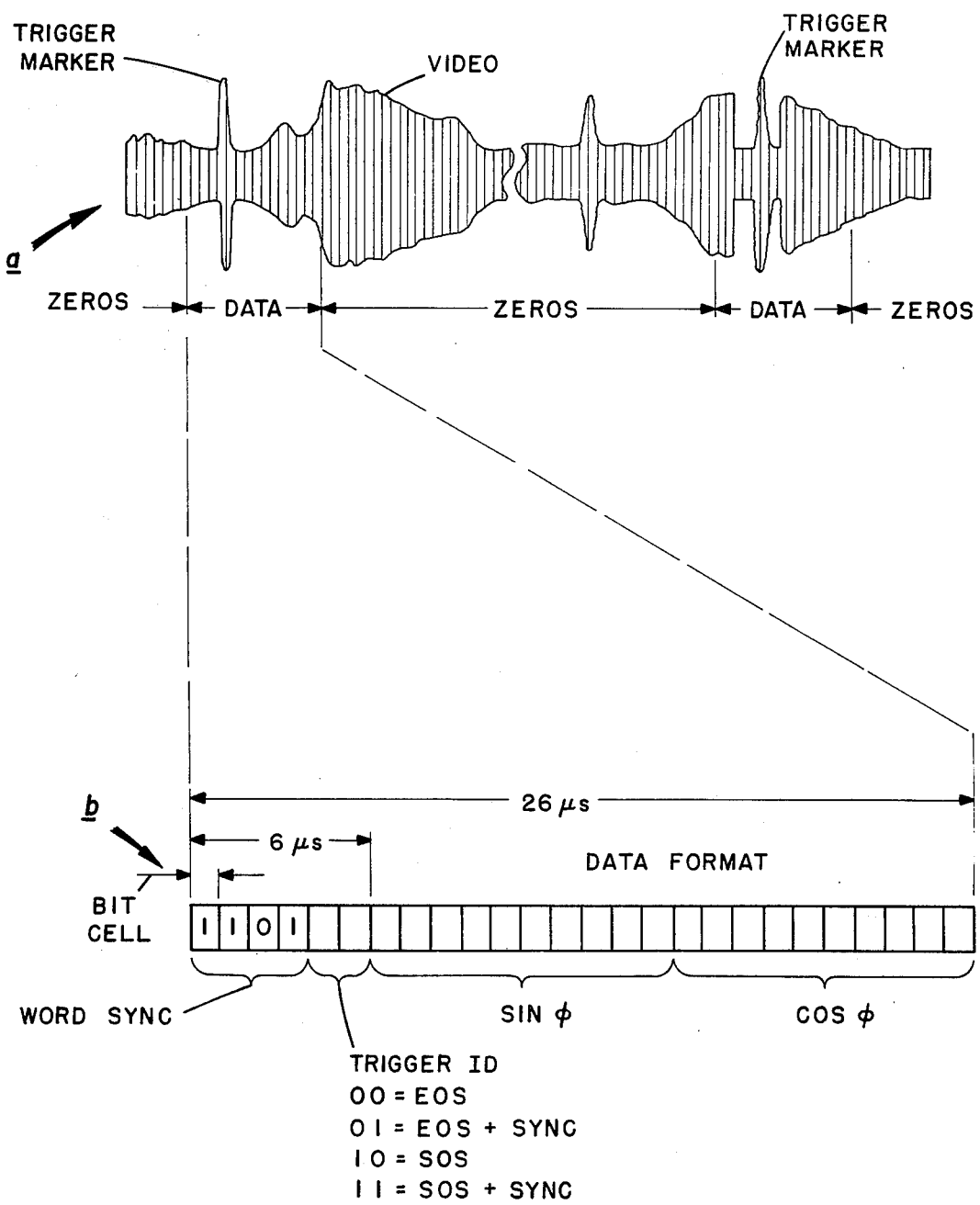
FIG. 5 illustrates a typical composite video signal generated for single track recording in accordance with the present invention and also the format employed during typical data encoding.

As illustrated in FIG. 5 of the drawings, the composite video format, proposed in accordance with one embodiment of the present invention, contains the radar video and trigger markers chopped by a bi-phase data signal. As previously noted, the bi-phase data has two fundamental frequencies, the bit rate frequency and twice the bit rate frequency. FIGS. 6a and 6b for example show a logical "zero" as having a zero crossing transition at the beginning of each bit cell, whereas a logical "one" has a transition at the beginning and in the center of the bit cell. Consequently, the bi-phase data may be decoded, as will be described, by detection of these zero crossing transitions.

Figure 1:
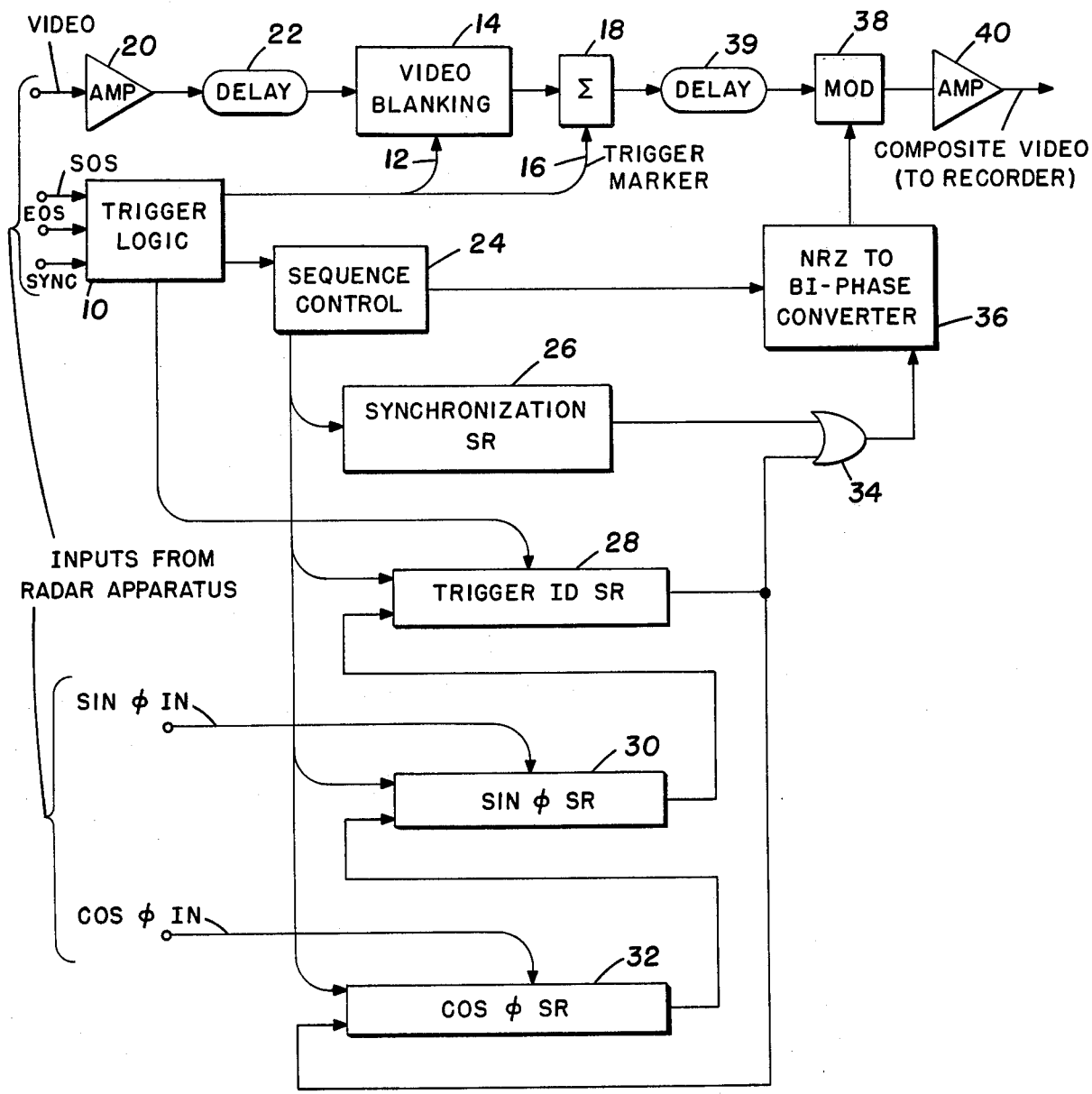
FIG. 1 is a block diagram of apparatus comprising one embodiment of the present invention for generating a composite radar data signal in a format for recording on a single track of a magnetic tape recorder.

Referring now to FIG. 1 and the associated timing diagrams of FIG. 3 each time a start of sweep (SOS) or end of sweep (EOS) trigger is received by trigger logic unit 10 from the radar receiver whose output is being recorded (waveform 3a) a five microsecond video blanking pulse is initiated (waveform 3b) and, following a two microsecond delay, a two microsecond trigger marker pulse is generated, (as indicated in waveform 3c). The video blanking pulse is applied on line 12 in FIG. 1 to a conventional video blanking circuit 14; whereas, the two microsecond trigger marker pulse is applied on line 16 to a summer circuit 18. As a result, the video input, which is applied through buffer amplifier 20 and a two microsecond delay circuit 22 in order to maintain correct time alignment between the video and trigger marker, is blanked for five microseconds to insure a clean detection window for the trigger marker pulse during the reproduce or playback operation, as will be described.

The input SOS trigger applied to trigger logic unit 10 also initiates formatting of the data word. More specifically and assuming a bit rate of 1 MHz, so that each bit cell is 1 microsecond in duration (see FIG. 5b) during the first four microseconds following receipt of the leading edge of the input SOS trigger pulse, a four-bit word synchronization sequence, comprising for example binary number 1101, is loaded by sequence control unit 24 into the synchronization shift register 26, followed by a two-bit trigger identification (ID) code loaded into shift register 28, 10 bits of bearing information loaded into shift register 30 representing the sine of the input bearing angle, and 10 bits of data loaded into shift register 32 representing the cosine of the bearing angle. For most applications, only bearing coordinate data is needed, although additional bits can be included in the data word if other data are required. In the illustrated embodiment, the ten bits of sine data and ten bits of cosine data, plus associated sign bits, will provide an angular or bearing resolution of approximately seven minutes. Moreover, the two trigger identification bits preceding the bearing data permit encoding identity of four different triggers or combination of triggers such as SOS, EOS, SOS + SYNC and EOS + SYNC. During the 4 microsecond interval in which the word synchronizing bits are formatted, the trigger logic unit 10 can accept a radar SYNC trigger. As is well-known to those skilled in the art, such a SYNC trigger would correspond to a so-called horizon or surface triggers $T_H$, $T_S$ or $R_{19}$ associated with different types of well-known radars. On the other hand, the start of sweep (SOS) trigger would commonly be known as the $T_M$ or $R_o$ trigger and the end of sweep (EOS) trigger would correspond to the $R_M$ trigger in a variable PRF type radar. Obviously, if desired and if a sufficiently high data rate is available, data formatting may be employed for redundancy checking purposes each time an EOS trigger is received, in addition to the data formatting upon receipt of an SOS trigger.

As soon as the cosine data portion of the data word has been loaded into shift register 32, the entire data word is shifted serially through the registers 32, 30 and 28, through the logical OR gate 34 and to the NRZ to bi-phase converter unit 36 which is connected to the modulator unit 38 where chopping or amplitude modulation of the video signal occurs. The data word is also fed back, from the output of the trigger ID shift register 28, into the registers 32, 30 and 28 so that it will be retained until new data is available.

As previously mentioned, in order to permit the generation of the proper trigger pulses during playback, the trigger identity code (from shift register 28) must precede the trigger marker pulse which has been added to the video signal, at summer 18, during the 5 microsecond blanking period. As illustrated in FIG. 1, this is accomplished by delaying at delay unit 39 the video signal, with trigger marker added, from the output of the summer circuit 18 prior to application to the modulator 38. In the illustrated first embodiment of the invention (see waveform 3d), the composite video is delayed by five and a half microseconds, at delay unit 39, for a total of seven and a half microseconds delay after initiation of data word coding; i.e., with a bit rate of 1 MHz and allowing four bits for word synchronization and two bits for trigger identification, the delay prior to modulator 38 must be greater than 6 microseconds. The modulated composite video output from the modulator unit 38 in FIG. 1 is applied to the tape recording head (not shown) by a suitable driver amplifier 40. Obviously, the tape recorder actually used in accordance with the present invention would depend upon the requirements of practice. A recorder having a bandpass of 1.5 MHz and a signal-to-noise ratio of 21db will provide acceptable radar picture quality, it has been determined.

Referring now to FIG. 2 and the reproduce portion of the proposed apparatus, the incoming composite video signal read from the recorder tape is applied to an absolute value generator 42 and a data decoder 44. As noted earlier, the data decoder converts the bi-phase sine and cosine data back to their original binary code representing bearing coordinates by detecting zero crossings in the data word. The absolute value generator 42, on the other hand, returns the chopped or modulated video signal to a monopolar DC signal containing the video and the trigger marker pulse(s).

Specifically, the data decoder 44 monitors and decodes the bi-phase data word (see FIG. 4 and the timing waveform of FIG. 4) to identify the four-bit word synchronization code (waveform 4c), the two-bit trigger ID code (waveform 4d), and the remaining 20 bits of bearing information. Near the end of the sixth bit of the decoded composite signal, the data decoder 44 establishes a 4 microsecond trigger marker detection window, as shown in waveform 4e. This four microsecond window is applied to a trigger marker detector 46 and enables such detector to pass the trigger marker pulse, from the video signal output of absolute value generator 42, onto the trigger generator 48. At the trigger generator 48, the combination of the decoded trigger identity, from decoder 44, and the detected trigger marker pulse initiates a proper trigger output; i.e., an end of sweep (EOS) trigger, a start of sweep (SOS) trigger, or a SYNC trigger, as appropriate. The four microsecond trigger marker detection window is also applied to a blanking circuit 50 to prevent the trigger marker pulse from appearing in the final video output which is derived by amplifying, at 52, the output from the absolute value generator 42.

A second embodiment of the present invention is shown in FIGS. 7 through 14 of the drawings and employs frequency modulation techniques for recording all of the necessary radar information on a single recorder track. More particularly, the recording portion of the second embodiment for generating the composite video signal is illustrated in the block diagram of FIG. 7. For consistency, the corresponding parts of the two embodiments are indicated with common reference numbers.

Once again, the input video from the radar receiver is applied through a suitable buffer amplifier 20, to a delay circuit 22 (delay equals 7 microseconds in this embodiment), and subsequently to a suitable video blanking circuit 14 where a blanking pulse (microseconds long in this embodiment) is applied in response to reception of an EOS or SOS trigger by the trigger logic unit 10 (see timing diagrams a and b of FIG. 9). As noted earlier, during this blanking interval, the trigger marker 16 is applied to and summed, at 18, with the radar video. The summed video and trigger marker signal (see waveform FIG. 14) is then applied to frequency modulator 54, where the video/trigger signal frequency modulates a first carrier frequency e.g., of 4.5 MHz. Subsequently, this frequency modulated carrier is applied to a delay unit 39 (delay equals 63.5 microseconds in second embodiment).

Similarly, each time a start of sweep (SOS) trigger is received at logic unit 10, a word is formatted in the bi-phase data code. In this second embodiment, the data code comprises an eight-bit word synchronization sequence, of which the middle four bits contain trigger identification information (see waveform 9e), and twenty-two bits of bearing data, two of which are parity check bits. A typical data word is illustrated in FIG. 14 of the drawings. In the second embodiment, the encoded bits would be of the same configuration as in the first embodiment (see FIG. 6a) except that a typical bit cell duration is chosen to be 6.1 microseconds, rather than 1 microsecond, so that the synchronization sequence which identifies the beginning of the data word and contains the trigger ID information would now extend for a total interval of 8(6.1) or 48.8 microseconds (see FIG. 14). In this embodiment, only the 8-bit word synchronization sequence, with trigger identification, is formatted when an end of sweep (EOS) is received; i.e., the remaining (bearing) data is formatted only on the occurrence of an SOS trigger, in order to minimize dead time usage. Between data words, in each embodiment, logical zeros are formatted in the bi-phase code. In the second embodiment, with a bit rate of 163 KHz, the delay imparted (by delay 39) to the video/trigger RF signal output of FM modulator 54 prior to mixing with the data RF is at least the 48.8 microseconds duration of the synchronization word portion of the data word, in order to assure that trigger identification encoding occurs prior to the trigger marker.

As shown in FIG. 7, the synchronization portion of the data word (with trigger ID) is loaded into a trigger and synchronization shift register 56, under the control of sequence control unit 24, and the coordinate sine and cosine bearing information (with parity bits) is subsequently loaded into the coordinate shift register 58. The contents of these two registers are then serially read out into an NRZ to bi-phase converter 36 to subsequently frequency modulate a second carrier signal (e.g. 688 KHz) at FM modulator 60. The output of the modulator 60, containing trigger ID, word synchronizing sequence and radar coordinate information, is subsequently mixed, at RF mixer 62, with the delayed video/trigger marker RF signal received from the second FM modulator 54 through delay unit 39. As noted earlier, this delay assures recovery, on playback, of the word synchronization/ trigger identification bits before the trigger marker occurs.

Referring now to the reproduce apparatus of the second embodiment, illustrated in the block diagram of FIG. 8, and to the associated timing diagrams of FIG.

10, the composite video signal picked up from the recorder tape is applied, following suitable preamplification, to high and low pass filters 64 and 66 selected to pass the 4.5 MHz and 688 KHz carriers respectively. A pair of FM demodulators 68 and 70 are connected to the filters 64 and 66 respectively, whereby each of the video, trigger marker pulses and data word are separated from their respective carriers. The remaining portion of the reproduce apparatus is functionally the same as that illustrated in FIG. 2 of the drawings and comprises, a data decoder 44 which monitors the demodulated bi-phase code for the 8-bit word synchronization code and establishes, near the end of the eighth bit containing trigger ID, an 8 microseconds wide trigger marker detection window (see FIG. 10, timing diagrams a through e) which is delayed by approximately 16 microseconds. As before, this window (diagram 10e) enables the trigger marker detector 46 of FIG. 8 to pass the trigger marker pulse to the trigger generator 48 where, in combination with the decoded trigger identity, it initiates the appropriate trigger output, EOS, SOS or SYNC. Here again, the trigger marker detection window is also applied to a suitable blanking circuit 50 in order to prevent the trigger marker pulse from appearing in the final video output.

A more detailed illustration of this second embodiment of the present invention is shown in FIGS. 11 12 and 13 of the drawings, and represents one manner of implementing the present invention on a commercially available color television video cassette recorder such as the Sony type VO-1800.

Referring now to FIG. 11, the proposed monotrack radar data recording/playback system of the present invention is designed to receive input from diverse types of radar equipments, as previously discussed. By way of example, the radar inputs might be received via a digital interface unit 76 such as that associated with the well-known Naval Tactical Data System (NTDS) wherein the radar bearing information is in the form of digital pulse rates which vary in proportion to the magnitudes of the sine and cosine of the bearing angle data. Alternatively, either scalar interface 78 or synchro interface 80 could be used in conjunction with the trigger pulse inputs SYNC, SOS and EOS, depending upon the requirements of practice and the particular type of radar to which the present apparatus is connected, to provide the trigger and coordinate inputs to the proposed apparatus. As mentioned previously, the various trigger pulses inputted to the record apparatus of the present invention are well-known to those skilled in the radar art and might be applied, for example, by means of the illustrated trigger receiver units 82, 83 and 84 in FIG. 11. The basic timing clock pulses for the apparatus of the present invention are derived from a suitable clock source 86 which is nominally set to produce an output of 10.4918 MHz in the illustrated embodiment and whose output is applied to a divide-by-64 circuit 88 in order to produce, on line 90, a basic clocking frequency of approximately 163 KHz, as noted previously. If a digital interface unit is employed, the output of the clock source 86, being equivalent to 1/128 of a mile, is available via amplifier 92 to the digital interface 76. In FIG. 11, the video input from the radar apparatus is applied through a variable attenuator 94, buffer amplifier 20, and the 7 microsecond delay 22 to a DC restorer 96 which maintains the video base line reference in order to prevent base line jump during blanking and to provide better control over the frequency modulation by the video signal.

As shown in FIG. 11, flip-flop 98 registers the occurrence of an EOS/SOS trigger pulse and flip-flop 100 registers the occurrence of a SYNC trigger pulse. More particularly, the EOS trigger pulse is received at trigger receiver 84 and is applied to OR gate 102, along with the corresponding EOS output from the digital interface 76 if used. Similarly, an SOS trigger is applied through trigger receiver 83 to OR gate 104, along with the zero range or SOS trigger output from the digital interface 76, if used. The outputs of the OR gate 102 and 104 are applied to the set and reset inputs respectively of the EOS/SOS register flip-flop 98 and also as inputs to an OR gate 106 whose output triggers a pair of one shot circuits 108 and 110 set to provide delays of 9 microseconds and 7 microseconds respectively. The output of the 9 microsecond one shot 108 is applied as the video blanking gate (see timing diagram 9b) to blanking switch 14 for the purpose of blanking the input radar video during summation of the trigger marker at summer circuit 18. The output of the 7 microsecond one shot 110, on the other hand, is applied to a 2 microsecond one shot 112 to generate the 2 microsecond trigger marker input to the summer 18 (see diagram 9c), 7 microseconds following receipt of the EOS/SOS pulse input. As previously noted, the buffered video input is delayed 7 microseconds, at delay unit 22, in order tpo maintain correct time alignment between the video and trigger marker pulse.

The output from the 9 microsecond one shot 108 is also applied as one input to an AND gate 114 whose other input is connected to the output of a 5 microsecond one shot 116 which is triggered by the SYNC trigger pulse from trigger receiver 82. Accordingly, during the 9 microsecond video blanking period, coincidence with any portion of the 5 microsecond pulse generated on the leading edge of the SYNC trigger sets the SYNC register flip-flop 100. The output from the 9 microsecond one shot 108 is also used to control a load data flip-flop 118, such that at the end of the 9 microsecond video blanking period, the appropriate trigger identity code on lines 119 is loaded into the third through sixth bit positions of shift register 120 with the clocking input on line 90. The four lines of input trigger ID data for the shift register 120 are connected, as shown in FIG. 11, to the Q and $\overline{Q}$ outputs of the flip-flops 98 and 100. It should be noted that the four word synchronization sequence bits (see diagram 9e ) are assumed to be hard-wired into the first, second, seventh and eighth bit positions of shift register 120.

The Q output of the one shot 118 is also applied to AND gate 122, along with the Q output of flip-flop 98 (signifying that a start of sweep SOS trigger has been received), so as to initiate loading of the bearing coordinate data (X, Y) into the shift register 124 from either the digital, scalar, or synchro interface unit, depending on which one is used. This load command is signalled to the interface unit by the triggering of one slot 126, whose output is represented at SC. As previously noted, a parity check is employed in the second embodiment of the present invention to insure that only valid coordinate data is reproduced during playback. Specifically, in FIG. 11, a parity generator 128 selectively adds a logical one to the input data to produce a predetermined odd or even number of one bit cells, as desired.

With the clocking pulse being inputted continuously to the shift registers 120 and 124, the entire data word containing the synchronization sequence, trigger ID and coordinate data is shifted serially through the registers to the NRZ-to-bi-phase converter 36 and then onto the apparatus shown in FIG. 12 wherein the serial data word is employed to frequency modulate the 688 KHz carrier signal.

The Q and $\overline{Q}$ outputs of the EOS/SOS flip-flop 98 are selectively applied as one input to the AND gates 130 and 132 respectively. The other input to the AND gate 132 is derived from a divided-by-10 unit 134 connected to the 163 KHz clocking signal on line 90. As a result, when an EOS trigger has been received, the AND gate 132 is enabled after a maximum of ten data bit intervals, inasmuch as no bearing data need be recorded. Specifically, with AND gate 132 enabled, the OR gate 136 operates to reset the SYNC flip-flop 100 and a flip-flop pair 138 and 140. Conversely, when an SOS trigger has been received, indicating that coordinate data should also be loaded, the AND gate 130 waits until a total of thirty clock pulses have been applied to the shift register pair 120, 124 (to load thirty data bits) as counted by divider 134 and serially connected divider 142. Once the flip-flops 138 and 140 have been reset, at the end of the desired data load period, the $\overline{Q}$ output of the flip-flop 140 goes high to inhibit the clock input to shaft registers 120, 124 and the divide-by-ten and divide-by-three units 134 and 142.

The serial data output from converter 36 (in bi-phase code form) and the video/trigger marker output from the buffer amplifier 144, at the output of summer 18, are applied to frequency modulators 60 and 54 (see FIG. 12) designed to produce frequency modulation of associated carriers at frequencies of 688 KHz and 4.5 MHz respectively. The resulting frequency modulated output from modulator 54 is applied to a narrow-banded 63.5 microsecond delay line 34 in order to permit generation of the proper trigger pulse during playback, by assuring that the trigger identity code precedes the trigger marker pulse. When summed with the 7 microsecond delay provided by delay line 22 (FIG. 11), it will be noted, the video RF is delayed by a total of 70.5 microseconds after initiation of data word coding.

The resultant video/trigger marker signal and data, in the form of frequency modulated carriers are next applied for mixing in RF mixer 62 and then to the illustrated RF section and the video recording heads of a conventional video tape recorder unit of FIG. 12. In accordance with usual practice, suitable buffer amplifiers 146 and 148 are interposed between the FM modulators 54, 60 and the RF mixer 62, and low-pass filter 150 is inserted in the data channel in order to prevent cross talk. Also, the illustrated video recorder apparatus contains a suitable muting circuit 151 in the video channel in order to inhibit the FM video signal, if desired, until the video recording heads are synchronized with the reference 60 Hz clock signal (e.g. at 1800 rpm) which is provided by the clock unit 152 to simulate a vertical synchronization signal normally associated with the recording/playback of the television type signals; i.e., where a television video cassette recorder such as the Sony VO-1800 is utilized for recording/playback in accordance with the present invention.

Buffer amplifiers 154 and 156 also apply the video/trigger marker and data RF signals to a signal demodulator unit, the front end of which includes a pair of electronic switches 160 and 162 controlled by a suitable record/playback switch (not shown) so as to select either (a) electronic-to-electronic mode used during the recording operation to monitor the information being recorded, or (b) a playback mode during which previously recorded video and data information are received from the RF section and are processed through the signal demodulator.

The signal demodulator of FIG. 12 includes a first plane lock loop demodulator 68 which recovers the video signal (with trigger marker), and a second phase lock loop demodulator 70 which responds to (via low-pass filter 66) and recovers the lower frequency data signal. The outputs of the demodulators 68 and 70 are then applied through buffers 164, 166 to low-pass filters 168, 170. Following amplification, if needed, at 171, the video/trigger marker signal is applied to a muting circuit 172 which functions to reduce the noise level, when no signal is being processed in either the record or playback mode, and through a suitable amplifier 174 to the playback processor circuitry shown in FIG. 13. The data output from the low-pass filter 170, on the other hand, is applied through limiter 176 to a zero-crossing detector 178 which decodes or detects the bi-phase data signal prior to application to the playback processing circuitry of FIG. 13. A suitable head SYNC pulse derived from the servo section of the illustrated video cassette recorder, to indicate when the video heads A and B switch, is applied through amplifier 180 to the playback circuitry of FIG. 13.

In FIG. 13, following DC restoration at 182, the video/trigger marker signal from the signal demodulator 158 is applied simultaneously to blanking circuit 50 and to trigger marker detector 46, for recovery of the trigger marker pulse. The serial data, following demodulation, is applied through line receiver 184 to a bi-phase decoder 185 whose output 185b goes high if a transition or zero crossing is detected in the middle of a bit cell; i.e., if a logical one is detected. The head SYNC pulse is applied, through line receiver 186, to trigger a serial pair of one shots 188 and 190.

The bi-phase decoder 185 produces one pulse on line 185a for each bit cell in the recovered data and, on line 185b, as mentioned, a pulse for each logical one detected. The one pulse-per-bit cell output is applied to a divide-by-11 circuit 192, to whose output is connected a one shot 194 which registers the occurrence of each eleven bit data block. The divide-by-11 circuit 192 also controls and repeatedly triggers a retriggerable one shot 196, as long as the divide-by-11 circuit 192 is counting. The one shot 196 functions to inhibit the illustrated SYNC gate 198 during the sine and cosine bit intervals in the data word, so as to prevent any code condition during sine and cosine intervals (and which corresponds logically to the word synchronization code sequence) from being detected as a SYNC word.

The other output 185b from the bi-phase decoder 185 is applied to an eleven-bit shift register 200 whose output is in the form of: an eight-bit word applied to the SYNC gate 198 corresponding to the initial eight bits of the recovered data signal; a four-bit word applied to a trigger register 202 corresponding to the middle four-bits (trigger ID) of the SYNC word (see FIG. 14); eleven bits of sine data applied to storage register 204; and eleven-bits of cosine data applied to register 206. The actual loading of the trigger ID, sine and cosine data into the registers 202, 204 and 206 respectively is controlled by sequence control unit 208, in response to recognition of a legitimate data word.

As illustrated in FIG. 13, the video blanking circuit 50 is controlled by a logical OR circuit 210 having three inputs. The first input to the OR gate 210 is derived from the output of the one shot 190, triggered by the head SYNC pulse in order to blank the head switching transients from the composite video input. In order to inhibit updating of the coordinate data if head switching occurs during the coordinate words, output of the one shot 190 is also applied to the sequence control 208. More specifically, the sequence control 208 holds the divide-by-11 counter 192 in a reset mode, via control line 212 and logical OR gate 214, until the SOS trigger identification has been detected, at which time this reset control is removed by sequencer 208 for two 11 count cycles. After the first eleven counts, the sine data now contained in the 11-bit shift register 200 is loaded into the sine register 204 provided no head switches occurred during the eleven count cycle. After the second eleven count cycle, the cosine data is loaded into the cosine register 206, provided no head switching has occurred during either of the eleven count cycles.

As previously mentioned, the sequence control unit 208 also responds to the detection of a valid SYNC word, as indicated by the operation of SYNC gate 198, and provides output on line 216 connected to the trigger marker detector 46 and the OR gate 210. As indicated in the timing diagrams c through h of FIG. 10, this output on line 216 indicates that a trigger marker is about to be received in the composite video/trigger marker signal and blanks video in order to assure detection of the trigger marker. If further assures that only one trigger pulse will be generated per trigger marker, so that the video will not needlessly be blanked. Specifically, this is accomplished by delaying the trigger marker detection, from the end of the SYNC word (first eight-bits), by approximately 16 microseconds (see diagram 10D, e, and f) and then generating a trigger marker detection window of 8 microsecond duration, centered on the occurrence of the recorded trigger marker.

The output of the trigger marker detector 46 is applied to a two microsecond one shot 218 to produce the regenerated trigger pulse, indicated at diagram g in FIG. 10, which is coupled to three AND gates 220, 222 and 224. The output of the one shot 218 is also fed back to the sequence control 208 to terminate the trigger marker detection blanking control, while at the same time (see line 225) assuring that the OR gate 210 retains the blanking gate for the duration of the trigger marker.

The sequence control unit 208 also is interconnected with a parity check circuit 226 which receives a pulse each time a logical one appears at the output of the bi-phase decoder 185. This assures that the sequence control unit 208 will pass along only valid sine and cosine data to the registers 204 and 206 respectively.

The trigger register 202 outputs the SYNC, EOS and SOS output trigger pulses, as detected, as second inputs to the AND gates 220, 222 and 224 respectively so that, when any one of these pulses occurs in coincidence with the regenerated trigger marker output from the one shot 218, the appropriate trigger amplifiers 228, 230 or 232 will output the proper trigger pulse. The respective coordinate outputs of sine and cosine registers 204 and 206, on the other hand, are applied to the appropriate digital-to-synchro, digital-to-scalar or digital-to-digital converters 234, 236 and 238, depending upon which form of output bearing information is desired. The 10.4918 MHz clock input from the record circuitry (FIG. 11) is shown as connected to digital-to-digital converter 238, along with the EOS and SOS triggers in order that coordinate information is properly outputted, e.g. for NTDS display.

The foregoing description and drawings comprise a disclosure of two different embodiments of the present invention. It should be understood at this time that various other modifications, adaptations and alterations to the present invention are possible in light of the above teachings. Therefore, within the scope of the appended claims, the invention may obviously be practiced otherwise than as specifically described hereinabove.

What is claimed is:

1. A system for recording and reproducing an informational first signal and a plurality of related event demarcating second signals comprising, in combination,
   a recording medium,
   recorder apparatus for recording signals on said recording medium and including,
      means responsive to the occurrence of an event demarcating second signal for generating a time marker signal demarcating said occurrence,
      adder means connected to receive and add together as an output said informational first signal and said time marker signal in a time alignment corresponding to the time alignment of said first and second signals,
      means responsive to said event demarcating second signal for producing a code identifying each of said plurality of event demarcating second signals as they occur and the associated time marker signal, and
      means for combining said identification code and the output of said adder means, with said identification code preceding in time the associated time marker signal at the output of said adder means, and
   reproducing apparatus for reproducing said recorded signals from said recording medium and including,
      means responsive to said recorded identification code for registering prior to the occurrence of the associated time marker signal in said recorded signals the identity of the event demarcating signal represented by said recorded associated time marker signal, and
      means responsive to said identification code registering means and said recorded associated time marker signal for reproducing each event demarcating signal in said correct time alignment with said informational first signal.

2. The system specified in claim 1 wherein said informational first signal is a radar video signal, said event demarcating second signals comprise a plurality of radar trigger pulses demarcating distinct times during radar operation, said recording apparatus includes means for combining said radar video signal with a bi-phase code representing radar coordinate data prior to recordation on said recording medium, and said reproducing apparatus includes means for decoding said bi-phase code to recover said coordinate data.

3. The system specified in claim 2 wherein said recording apparatus further includes means for blanking said radar video signal during a time interval encompassing said trigger marker signal and wherein said video signal is delayed prior to application to said blanking means in order to compensate for time delay in generating said time marker signal preserve correct timing alignment between said video signal and the radar trigger pulse represented by said trigger marker.

4. The system specified in claim 2 wherein the bi-phase code representing radar coordinate data amplitude modulates said radar video signal.

5. The system specified in claim 2 wherein said radar video and said trigger marker signal demarcating the occurrence of a radar trigger pulse is applied to frequency modulate a first carrier signal, said trigger identification code and said bi-phase code representing radar coordinate data is applied to frequency modulate a second carrier frequency, and wherein said first and second carrier frequencies are mixed together prior to recording on said recording medium.

6. The system specified in claim 5 wherein said reproducing apparatus further includes first and second frequency demodulators for selectively demodulating the first carrier signal to recover the radar video and trigger marker signal and the second carrier frequency to recover said trigger identification code and said radar coordinate data.

7. The system specified in claim 2 wherein the bi-phase code representing radar coordinate data includes logical 1's and 0's, the bit elements of said code being distinguished by the number and location of signal transitions in each bit interval, and wherein said decoding means comprises means to detect the signal transitions in each bit interval of said recorded data.

8. The system specified in claim 2 wherein the means for combining said trigger identification code and the output of said adder means includes delay means for assuring that said trigger identification code can be decoded prior to reproduction of a radar trigger pulse in response to a recorded associated trigger marker signal.

9. The system specified in claim 8 wherein said reproduce apparatus includes means responsive to a trigger identification code for generating a trigger marker detection window during which said trigger marker may be detected and means for decoding said trigger identification code to generate the appropriate radar trigger pulse as output.

10. The apparatus specified in claim 9 further including means for decoding radar coordinate data recorded on said recording medium.

11. The apparatus specified in claim 9 wherein said reproduce apparatus further includes means to insure that only one trigger pulse is generated for each trigger marker signal detected in said recorded signals.

12. The system specified in claim 2 wherein said coordinate data includes a parity check bit to validate said coordinate data and said reproduce apparatus includes means responsive to said parity check bit for assuring reproduction of only valid coordinate data.

13. The system specified in claim 2 wherein said reproducing apparatus includes means to prevent said trigger marker from appearing in the radar video signal as reproduced.

14. The system specified in claim 13 wherein said prevention means comprises meansfor blanking said reproduced radar video signal for a predetermined interval encompassing said trigger marker as recorded.

15. The system specified in claim 1 wherein said informational first signal is a radar video signal, said event demarcating second signals include at least one trigger pulse demarcating the start of a radar sweep, and said time marker signal generating means generates at least one time marker signal associated with and demarcating said start of sweep radar trigger pulse for addition to said radar video signal.

16. The system specified in claim 15 wherein said recorder apparatus includes means to produce a digital code representing radar coordinate data, and means for combining into a composite signal prior to recordation on said recording medium said coordinate data code with said added-together radar video and time marker signals, and wherein said reproducing apparatus includes first means for recovering said radar video signal from said composite signal, second means for recovering each radar trigger pulse, and third means for decoding said coordinate data code.

* * * * *

UNITED STATES PATENT OFFICE
CERTIFICATE OF CORRECTION

Patent No. 4,047,170      Dated September 6, 1977

Inventor(s) Robert E. Miller

It is certified that error appears in the above-identified patent and that said Letters Patent are hereby corrected as shown below:

Column 1, after the title of invention insert:

-- The invention described herein was made in the course of work under a contract with the Department of the Navy. --.

*Signed and Sealed this*

*Twenty-first* Day of *March 1978*

[SEAL]

Attest:

RUTH C. MASON      LUTRELLE F. PARKER
*Attesting Officer*      *Acting Commissioner of Patents and Trademarks*